United States Patent

Ebina et al.

[11] Patent Number: 6,141,315
[45] Date of Patent: Oct. 31, 2000

[54] PHASE CHANGE OPTICAL RECORDING MEDIUM CONTAINING OXYGEN AND PROCESS FOR MANUFACTURING THE SAME

[75] Inventors: Atsushi Ebina; Takashi Tomie; Toru Horiguchi, all of Hino, Japan

[73] Assignee: Teijin Limited, Osaka, Japan

[21] Appl. No.: 09/064,611

[22] Filed: Apr. 23, 1998

[30] Foreign Application Priority Data

Apr. 25, 1997 [JP] Japan ..................................... 9-108864
May 27, 1997 [JP] Japan ..................................... 9-136682
Jul. 15, 1997 [JP] Japan ..................................... 9-189686

[51] Int. Cl.$^7$ ................................................. G11B 7/24
[52] U.S. Cl. ..................................... 369/275.2; 430/273.1
[58] Field of Search .......................... 369/275.2, 275.3, 369/275.1, 13, 283, 284; 430/273.1, 270.13; 428/216, 64.3, 64.4, 64.5, 694 DE, 694 SC, 694 XS, 694 RL, 698

[56] References Cited

U.S. PATENT DOCUMENTS

| 5,194,363 | 3/1993 | Yoshioka et al. ................... 430/271 |
| 5,271,978 | 12/1993 | Vazan et al. ............................ 428/64 |
| 5,498,507 | 3/1996 | Handa et al. ......................... 430/275.1 |
| 5,627,012 | 5/1997 | Tominaga et al. ............... 430/270.13 |

FOREIGN PATENT DOCUMENTS

| 4-119885 | 4/1992 | Japan .............................. B41M 5/26 |
| 4-329183 | 11/1992 | Japan .............................. B41M 5/26 |
| 4-74785 | 11/1992 | Japan .............................. G11B 7/24 |
| 6-139615 | 5/1994 | Japan .............................. G11B 7/24 |
| 6-314439 | 11/1994 | Japan .............................. G11B 7/24 |

OTHER PUBLICATIONS

Patent Abstracts of Japan for JP 63 058636 A, (Matsushita Elec Ind Co., Ltd.), Mar. 14, 1988.
Patent Abstracts of Japan for JP 01 019545 A, (Matsushita Elec Ind Co., Ltd.), Jan. 23, 1989.
Derwent Publications Ltd. for JP 04 316887 A (Matsushita Elec Ind Co., Ltd.), Nov. 9, 1992.
Patent Abstracts of Japan for JP 02 146120 A (Fujitsu Ltd), Jun. 5, 1990.
Patent Abstracts of Japan for JP 04 119885, (Matsushita Elec Ind Co., Ltd.), Apr. 21, 1992.
Derwent Publications Ltd. for JP 05 342631 A (Matsushita Elec Ind Co., Ltd.), Dec. 24, 1993.
Derwent Publications Ltd. for JP 03 263626 A (Matsushita Elec Ind Co., Ltd.), Nov. 25, 1991.
Patent Abstracts of Japan for JP 04 119886 A (Matsushita Electric Ind Co Ltd), Apr. 21, 1992.
Patent Abstracts of Japan for JP 06 314439 A (Matsushita Electric Ind Co Ltd), Nov. 8, 1994.
Patent Abstracts of Japan for JP 07 057299 A (Matsushita Chem Corp), Mar. 3, 1995.

*Primary Examiner*—Ali Neyzari
*Attorney, Agent, or Firm*—Sughrue, Mion, Zinn, Macpeak & Seas, PLLC

[57] ABSTRACT

In a phase change optical recording medium in which writing, reading and/or erasing of information is conducted by utilizing change of phase of a recording layer by irradiation with light, the recording layer is made of a material containing oxygen in an amount of 1 to 30 atomic %; or the recording medium comprises an additional transparent dielectric layer 1 to 10 nm thick between the recording layer and the underlying transparent dielectric layer and the inserted transparent dielectric layer in contact with the recording layer comprising oxygen in a molar ratio greater than a molar ratio of oxygen in the underlying transparent dielectric layer; or the transparent dielectric layer underlying and in contact with the recording layer comprises oxygen in a molar ratio greater than a molar ratio of oxygen in the other transparent dielectric layer.

4 Claims, 3 Drawing Sheets

PHASE CHANGE OPTICAL RECORDING MEDIUM CONTAINING OXYGEN AND PROCESS FOR MANUFACTURING THE SAME

BACKGROUND OF THE INVENTION

1. Field of the Invention

The present invention relates to a phase change optical recording medium, in which writing, reading and/or erasing of information is conducted by utilizing a change of phase of a recording layer by irradiation with light, and to a process for manufacturing the same.

2. Description of the Related Art

The phase change optical recording medium utilizes, for recording information, a reversible structural change (phase change) between an amorphous state and a crystalline state of a material created by irradiation with light, particularly a laser beam. Such a phase change optical recording medium may have a high storage capacity.

As a result, a phase change optical recording medium with a high speed erase and rewrite of written information performance has been sought. To attain this, it is essential to have a stable repeated overwrite operation. Overwrite means writing new information over previously written information while it is being erased. It is preferred that the possible number of repeatable times of erasing and writing is high.

A phase change optical recording medium is commercially available as a rewritable optical recording disc. For example, a 120 nm phase change optical recording disc is commercially available. A typical disc comprises a stack structure of a polycarbonate, a first dielectric layer of ZnS•SiO$_2$, a phase change recording layer of GeSbTe, a second dielectric layer of ZnS•SiO$_2$, a reflective layer of an Al alloy and a UV-cured organic resin coated layer in this order.

The level of erase or overwrite repetition durability (cyclability) of these commercially available discs is practically acceptable, but it is still desired that this repetition durability is further improved from the viewpoint of the reliability of the products. It is also desired that the cyclability is further improved from the viewpoint of the production yield since the durability is largely influenced by the conditions of production such as sputtering conditions.

Further, since a high density overwrite disc which is now under development uses a mark edge recording method, deterioration of the recording layer by repeated overwrite significantly adversely affects the quality of the signal and the overwrite repetition durability is important.

It is known that the repeating overwrite characteristics are influenced by various properties of the materials of the recording layer and protecting layers. Thus, as a material for a recording layer, for example, GeSbTe is known. It is reported that a compositional ratio Ge:Sb:Te in a range of 2:2:5 to 2:2.5:5 provides an excellent repetition characteristic. It is also reported that a recording layer in which Cr or N is added to GeSbTe allows further improvement of repetition characteristic.

In a phase change optical recording medium, recording is effected by making a recording layer amorphous by rapid cooling after melting with a high power laser beam irradiation and erasing is effected by making a recording layer crystalline by a gradual cooling after heating with a medium power laser beam irradiation. In order to record and store information, a stable operation in a large number of repetitions of writing and erasing is essential. However, since the write and erase operations involve repetition of rapid heating by more than 300° C., melting and cooling, a recording layer and protecting layers are thermally damaged, the material of a recording layer flows and is deformed, and/or segregation may occur depending on the composition of a recording layer, so that the information quality is deteriorated and the number of stable repeated operation of write and erase is limited.

To improve the write and erase repetition characteristic, there are proposed a selection of a composition of a recording layer with less segregation, a suppression of thermal damage by using a small thermal expansion coefficient material in a protecting layer, provision of an adhesive layer between a recording layer and a protecting layer so as to suppress flow and deformation of a recording layer, and so on.

Also, it is reported that limiting an oxygen content in a recording layer to not more than 2000 ppm can significantly reduce mass flow in the recording layer and allows a stable repetition characteristic be obtained in a wide laser power range (Japanese Unexamined Patent Publication (Kokai) No. 04-329183).

Further, it is reported that inclusion of oxygen in a recording layer improves a repetition characteristic (Japanese Unexamined Patent Publication (Kokai) No. 04-119885). However, the amount of oxygen added to a recording layer is limited, so as not to change the physical properties of the recording layer, by selecting a sputtering atmosphere having an oxygen partial pressure in a range of 5×10 Torr to 1×10$^{-4}$ Torr.

Nevertheless, it is still desired that the rewrite repetition characteristic of a phase change optical recording medium is further improved.

Therefore, an object of the present invention is to solve the above problems, to improve the overwrite and erase repetition durability and to provide a phase change optical recording medium which allows stable rewriting and reading.

The following materials, as examples, have been developed as the materials for a protecting layer: non-oxides such as an Al nitride, a Si nitride, MgF$_2$ and AlF$_3$, oxides such as SiO$_2$, Al$_2$O$_3$, ZrO$_2$ and TiO$_2$, chalcogenides such as ZnS, mixtures of a chalcogenide and an oxide such as a mixture of ZnS•SiO$_2$, and the like. These materials are deposited as a thin layer by a known method and are used as protecting layers but the obtained discs do not allow a sufficient number of repetitions of overwriting.

The protecting layer of a phase change optical recording medium must be excellent in heat resistance and mechanical properties, since it is subjected to thermal and mechanical loads during writing and erasing, and also must have a function of protecting the recording layer during storage of the optical medium. Further, it must have a low thermal conductivity from the viewpoints of recording sensitivity and repetition durability.

The protecting layer of an oxide or nitride has a weak adhesive force with a recording layer comprising a chalcogen. As a result, during storage in a high temperature and humidity environment, the protecting layer may peel off or cracks may be formed in the protecting layer. Partly due to a weakness in the adhesive force between the protecting layer and the recording layer, heating supplied to the recording layer from a laser beam is not dissipated at an appropriate rate and the recording marks are connected with each other and the material may flow in one direction, resulting in reduction in the number of erase and overwrite repetitions.

Some methods have been proposed to improve the erase and overwrite repetition property. For example, Japanese Unexamined Patent Publication (Kokai) No. 06-139615 reported that provision of an adhesive layer of $Al_2O_3$, $GeO_2$, $SiO_2$, $Ta_2O_5$, $Y_2O_3$ or the like between a protecting layer and a reflective layer and/or between a protecting layer and a recording layer improves the number of erase and overwrite repetitions.

Japanese Unexamined Patent Publication (Kokai) No. 06-314439 reported that in an optical recording medium comprising a substrate, a first dielectric layer of ZnS•$SiO_2$, a second dielectric layer of ZnS•$SiO_2$, a recording layer, a third dielectric layer of ZnS•$SiO_2$, a fourth dielectric layer of ZnS•$SiO_2$, and a reflective layer, the layer strength is improved by including nitrogen in the first and/or fourth dielectric layers, and adhesion of a recording layer and protecting layers is improved by deposited the second and third dielectric layers in a rare gas atmosphere.

The effect of improving the number of erase and overwrite repetition is not sufficient in each of the above proposals.

In accordance with an investigation by the inventors, the following conditions must be met to have a sufficient erase and overwrite repetition durability: (1) The wettability between an adhesive layer and a recording layer of a chalcogenide which is fused and made amorphous must be excellent, and the adhesive layer must not deteriorate by being repeatedly exposed to high temperatures. (2) The layers must have a sufficient adhesion with each other. (3) The adhesion of the adhesive layer with the reflective layer must be excellent.

In the prior art, only the adhesion of the adhesive layer with the recording layer is considered but the adhesion of the adhesive layer with the reflective layer is often not considered, which is one of the reasons why a sufficient erase and overwrite repetition durability was not obtained.

Since an excess laser power may deteriorate the repetition durability, the heat conduction coefficients of the adhesive layer and the protecting layer must be sufficiently small, in order to have a sufficient recording sensitivity at a low laser power, which is required for a practical disc medium.

From these requirements, the above reports and proposals of the prior art may be considered as below:

Japanese Unexamined Patent Publication (Kokai) No. 06-139615 adopts an adhesive layer of an oxide. It is considered that a chalcogen-containing recording layer has a low affinity with an oxide and therefore does not have a sufficient adhesion with the oxide adhesive layer. Even if adhesion between an oxide adhesive layer and a non-fused recording layer is excellent, the wettability between an oxide adhesive layer and a recording layer is low, which results in repellence and flow of the fused material of the recording layer and results in insufficient repetition durability of the disc. It is also supposed that one of the reasons for the insufficient repetition durability is a lack of consideration of the heat resistance of the protecting layer, which causes a change in the crystallinity of the protecting layer by repeated heating and thus deterioration of the repetition durability.

In Japanese Unexamined Patent Publication (Kokai) No. 06-314439, a dielectric layer of ZnS•$SiO_2$ deposited in a rare gas atmosphere may tend to have oxygen in an amount less than the stoichiometric amount and therefore have a non-smooth or rough surface, and a recording layer formed on the non-smooth surface of the dielectric layer has a weak bond to the dielectric layer and may easily be peeled or cracked during repeated overwriting and erasing. This is considered to be one reason for a insufficient repetition durability. Control of the oxygen content requires deposition under delicate conditions or under narrow conditions, which decreases the productivity. Although a dielectric layer of ZnS•$SiO_2$ containing nitrogen and/or oxygen has an improved layer strength, the adhesive force of the layer to a substrate and a reflective layer is low so that the repetition durability is lowered.

The object of the present invention is to solve the above problems, improve the adhesion of a protecting layer with a recording layer and provide a phase change optical recording medium without peeling, cracking or flow of a layer.

SUMMARY OF THE INVENTION

The present invention, which attains the above objects, resides in a phase change optical recording medium in which writing, reading and/or erasing of information is conducted by utilizing change of phase of a recording layer by irradiation with light, said recording medium comprising a substrate, a first transparent dielectric layer on the substrate, a recording layer on the first transparent dielectric layer, a second transparent dielectric layer on the recording layer, and a reflective layer on the second transparent dielectric layer, an improvement being comprised of one of the following:

1) said recording layer is made of a material containing oxygen in an amount of 1 to 30 atomic %, preferably 3 to 15 atomic %, based on the recording layer;

2) said recording medium further comprises a third transparent dielectric layer between said first transparent dielectric layer and said recording layer, said third transparent dielectric layer contacting with said recording layer and containing oxygen in a molar ratio greater than a molar ratio of oxygen in said first transparent dielectric layer (or containing an oxide which contains oxygen in a molar ratio based on said oxide greater than a molar ratio of oxygen in an oxide in said first transparent dielectric layer), said third transparent dielectric layer having a thickness of 1 to 10 nm; and 3) said first transparent dielectric layer in contact with said recording layer contains oxygen in a molar ratio greater than a molar ratio of oxygen in said second transparent dielectric layer (or contains an oxide which contains oxygen in a molar ratio based on said oxide greater than a molar ratio of oxygen in an oxide in said second transparent dielectric layer).

In accordance with the present invention, there is also provided a process for manufacturing a phase change optical recording medium in which writing, reading and/or erasing of information is conducted by utilizing change of phase of a recording layer by irradiation with light, said process comprising the steps of preparing a substrate, forming a first transparent dielectric layer on the substrate, forming a recording layer on the first transparent dielectric layer, forming a second transparent dielectric layer on the recording layer, and forming a reflective layer on the second transparent dielectric layer, an improvement being comprised of one of the following:

1) said recording layer is deposited by sputtering conducted in an atmosphere in which at least one oxygen atom-containing gas is included;

2) said process further comprises a step of forming a third transparent dielectric layer between said first transparent dielectric layer and said recording layer, said first and second transparent dielectric layers being formed by sputtering in a rare gas atmosphere and said third transparent dielectric layers being formed by sputtering in an atmosphere comprising a gaseous mixture of at least one oxygen atom-containing gas and a rare gas, said third transparent dielectric layer having a thickness of 1 to 10 nm and being in contact with said recording layer; and 3) said first transparent dielectric layer is formed by sputtering in an atmosphere comprising a gaseous mixture of at least one oxygen atom-containing gas and a rare gas, and said second transparent dielectric layer is formed by sputtering in a rare gas atmosphere.

Figure 1:
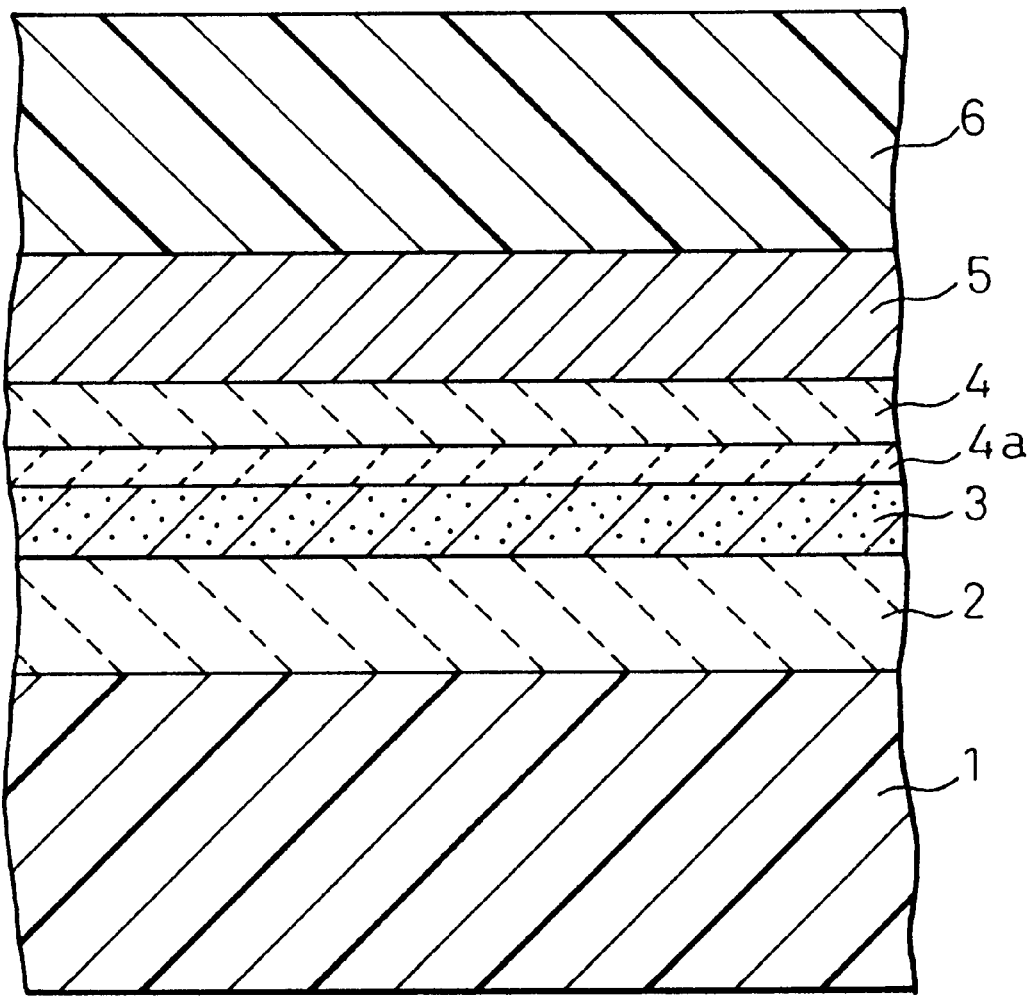
FIG. 1 is a cross-sectional view of a phase change optical recording medium.

DESCRIPTIONS OF THE PREFERRED EMBODIMENTS (1) In a first embodiment of the present invention, the recording layer of a phase change optical recording medium comprises oxygen in an amount of 1 to 30 atomic %. By this inclusion of oxygen in an amount of 1 to 30 atomic % based on the recording layer, peeling, cracking and flow of the recording layer and other causes for reducing the repetition durability are prevented and a phase change optical recording medium having a stable overwrite and erase characteristic is provided. If the amount of the oxygen is less than 1 atomic %, the effect of preventing flow, etc. of the recording layer is insufficient and therefore an improvement of the repetition durability cannot be obtained. If the amount of the oxygen is more than 30 atomic %, the recording layer is excessively oxidized so that stable operation of repeated overwrite and erase cannot be obtained and thus the repetition durability decreases. Also, when the amount of the oxygen is more than 30 atomic %, an optical medium cannot have an appropriate sensitivity or an appropriate reflectivity.

The oxygen-containing recording layer of the present invention is preferably a recording layer containing Ge, Sb and Te which is excellent in repeated erase and write characteristics. It is preferable that the recording layer comprises Ge, Sb and Te in an amount of at least 90 atomic % based on the remainder of the recording layer when oxygen is excluded. The recording layer preferably has a thickness of 5 to 40 nm, more preferably 10 to 30 nm. If the thickness of the recording layer is less than 5 nm, sufficient recording characteristics are not obtained. If the thickness of this layer is more than 40 nm, the recording layer tends to flow resulting in deterioration of the repetition durability.

The oxygen-containing recording layer of the present invention may be preferably formed by sputtering in a mixed gas of Ar or another rare gas and at least one oxygen-containing gas such as $H_2O$ gas, $CO_2$ gas and CO gas. The other oxygen-containing gas includes $CH_3OCH_3$, $CH_3OH$ and $CH_3COCH_3$. The method of introducing the oxygen-containing gas to the atmosphere is not particularly limited. The mixed gas may include nitrogen ($N_2$) gas.

The transparent dielectric layer, i.e., the protecting layer, is preferably in an amorphous state having a suitable refractive index, typically 1.8 to 2.6. Here, the term "an amorphous state" means that the layer does not have definite diffraction peaks in a diffraction spectrum chart by the X-ray diffraction method used as a crystal analysis method, but it is acceptable that broad spectrums having a full width half maximum of about 5 degrees or more appear in a diffraction spectra chart with the abscissa being 2θ. Due to the amorphous state of the protecting layer, both the adhesion with the crystalline recording layer and with the reflective layer are simultaneously excellent. Such a protecting layer may be of a material in which about 10 to 30 mole % of an oxide such as $SiO_2$, $GeO_2$, $SnO_2$ and $In_2O_3$ or a nitride such as $Si_3N_4$ is added to a crystalline metal chalcogenide such as ZnS, ZnSe, ZnTe, PbS and PbTe.

Particularly, a material mainly comprised of ZnS added with an oxide is preferable since it is excellent in transparency, has a small layer stress and is excellent in adhesion with the recording layer. Further, if the above oxide is $SiO_2$, the effect of making the layer amorphous is large, the thermal conductivity is small and the material cost is low and therefore it is particularly preferable. Here, the amount of $SiO_2$ added to ZnS is preferably 12 to 35% by mole and, particularly, around 20% by mole of $SiO_2$ is most effective as a protecting layer. If the amount of $SiO_2$ is less than 12% by mole, the effect of making the layer amorphous is small and the layer stress is large. If the amount of $SiO_2$ is more than 35% by mole, disadvantageously, the refractive index becomes small, the recording sensitivity is lowered and the overwrite durability is deteriorated. At about 20% by mole of $SiO_2$, the protecting layer is most effective from the viewpoints of the optical properties, the recording sensitivity and the repeated overwrite durability.

An adhesive layer may be inserted between the recording layer and the protecting layer, i.e., the transparent dielectric layer. A preferable adhesive layer in contact with the recording layer of a chalcogen alloy or an oxygen-containing chalcogen alloy is a crystalline layer of a metal sulfide having a thickness of 10 to 30 nm. The metal sulfide includes ZnS and PbS, but ZnS is particularly preferred since it is excellent in transparency and adhesion with the recording layer. The thickness of the adhesion layer may be in a range of 10 to 30 nm. If the thickness of the adhesion layer is less than 10 nm, the effect of improving the adhesion is insufficient, and if the thickness of the layer is more than 30 nm, the repetition durability is deteriorated.

The substrate is typically made of a plastic. A polycarbonate substrate is excellent since it has excellent mechanical properties and has a lower humidity absorption in comparison with other plastics.

A resin layer may be formed on the reflective layer to protect the medium from the environment. This resin protecting layer may be made of ultra violet ray-curable resin such as epoxy resins, acrylates, methacrylates and the like.

The medium comprises, on the substrate and in order, the first transparent dielectric layer, the recording layer, optionally the adhesive layer, the second tranparent dielectric layer, the reflective layer and the resin protecting layer. These layers from the first tranparent dielectric layer to the reflective layer may be deposited successively and, if necessary, in a vacuum deposition system such as a sputtering system.

FIG. 1 shows a cross-sectional view of an example of the first embodiment of the present invention, in which the reference numeral 1 denotes a substrate, 2 a first tranparent dielectric layer, 3 a recording layer, 4 a an adhesive layer, 4 a second tranparent dielectric layer, 5 a reflective layer and 6 a resin protecting layer. The recording layer 3 is characterized by containing oxygen in an amount of 1 to 30 atomic %, in accordance with the first embodiment of the present invention.

(2) In the second embodiment of a phase change optical recording medium of the present invention, the recording medium further comprises a third transparent dielectric layer between the first transparent dielectric layer and the recording layer, the third transparent dielectric layer, in contact with the recording layer, containing oxygen in a molar ratio greater than a molar ratio of oxygen is the first transparent dielectric layer (or containing an oxide which contains oxygen in a molar ratio based on said oxide greater than a molar ratio of oxygen in an oxide in said first transparent dielectric layer), said third transparent dielectric layer having a thickness of 1 to 10 nm.

As described before, when an oxide-containing material is deposited, the deposited oxide tends to have a composition that the content of oxygen is less than the stoichiometric ratio of the oxide and, as a result, the surface of the deposited layer becomes non-smooth or rough. Therefore, a recording layer deposited on the non-smooth or rough surface of the transparent dielectric layer may have a weak bond with the transparent dielectric layer and peeling or the formation of cracks may occur. Thus, the overwrite and erase repetition durability of the medium becomes insufficient and therefore it is demanded that the overwrite and erase repetition durability of the medium be further improved.

To meet the above demand, in accordance with the present invention, a third transparent dielectric layer containing an oxide having a composition that the content of oxygen is more than that of the first transparent dielectric layer is provided between the first transparent dielectric layer and the recording layer so that the surface of the third transparent dielectric layer is smoother than that of the first transparent dielectric layer. As a result, the adhesion of the recording layer with the underlying transparent dielectric layer is improved and peeling of the layer, formation of cracks, flow of the recording layer and the like which cause a reduction of the repetition durability of the medium are prevented.

The molar ratio of oxygen based on an oxide means the ratio "x/(1+x)" if an oxide is represented by $MO_x$. If an oxide is represented by $M_mO_n$, the molar ratio is n/(m+n).

A greater molar ratio of oxygen in the third transparent dielectric layer than that in the first transparent dielectric layer can be obtained, for example, by sputtering the third transparent dielectric layer, using the same target as the target used for the first transparent dielectric layer, in an atmosphere which contains an oxygen-containing gas, while the first transparent dielectric layer is deposited in an atmosphere which does not include an oxygen-containing gas.

Since it is generally preferred that the transparent dielectric layers as the protecting layers of an optical recording medium do not contain excess oxygen, it is preferred in the second embodiment of the present invention that only the third transparent dielectric layer inserted between the first transparent dielectric layer and the recording layer and in contact with the recording layer is formed by sputtering in a mixed gas of an oxygen-containing gas and an inert gas, but the other transparent dielectric layers are formed in an inert gas atmosphere without an oxygen-containing gas. Although the present invention is not necessarily limited to the first and second transparent dielectric layers deposited in a rare gas alone, it is preferred.

The oxygen-containing gas which can be used for forming the third transparent dielectric layer may be any of the gases as mentioned before for forming the oxygen-containing recording layer, concerning the first embodiment of the present invention.

If the thickness of the third transparent dielectric layer is less than 1 nm, the non-smooth or rough surface of the first transparent dielectric layer is not compensated for so that the adhesion between the recording layer and the underlying transparent dielectric layer is not sufficiently improved and the effect of improving the repetition durability is small. If the thickness of the third transparent dielectric layer is more than 10 nm, excess oxygen, for example, oxidizes the recording layer during repeated overwrite, resulting in a reduced repetition durability. Further, if the thickness of the third transparent dielectric layer is more than 10 nm, the layer stress becomes large so that peeling and cracking may easily occur and a recording medium having an appropriate sensitivity and reflection is not obtained.

The first transparent dielectric layer may be basically the same as the first and second transparent dielectric layers as described above for the first embodiment of the present invention, except that the oxygen molar ratio of the third transparent dielectric layer is lager than that of the first transparent dielectric layer.

The first and second transparent dielectric layers may be basically the same as those as described above for the first embodiment of the present invention.

In the second embodiment of the present invention, the other elements of the recording medium may be basically the same as described for the first embodiment of the present invention except that the recording layer is typically not an oxygen-containing layer.

Figure 2:
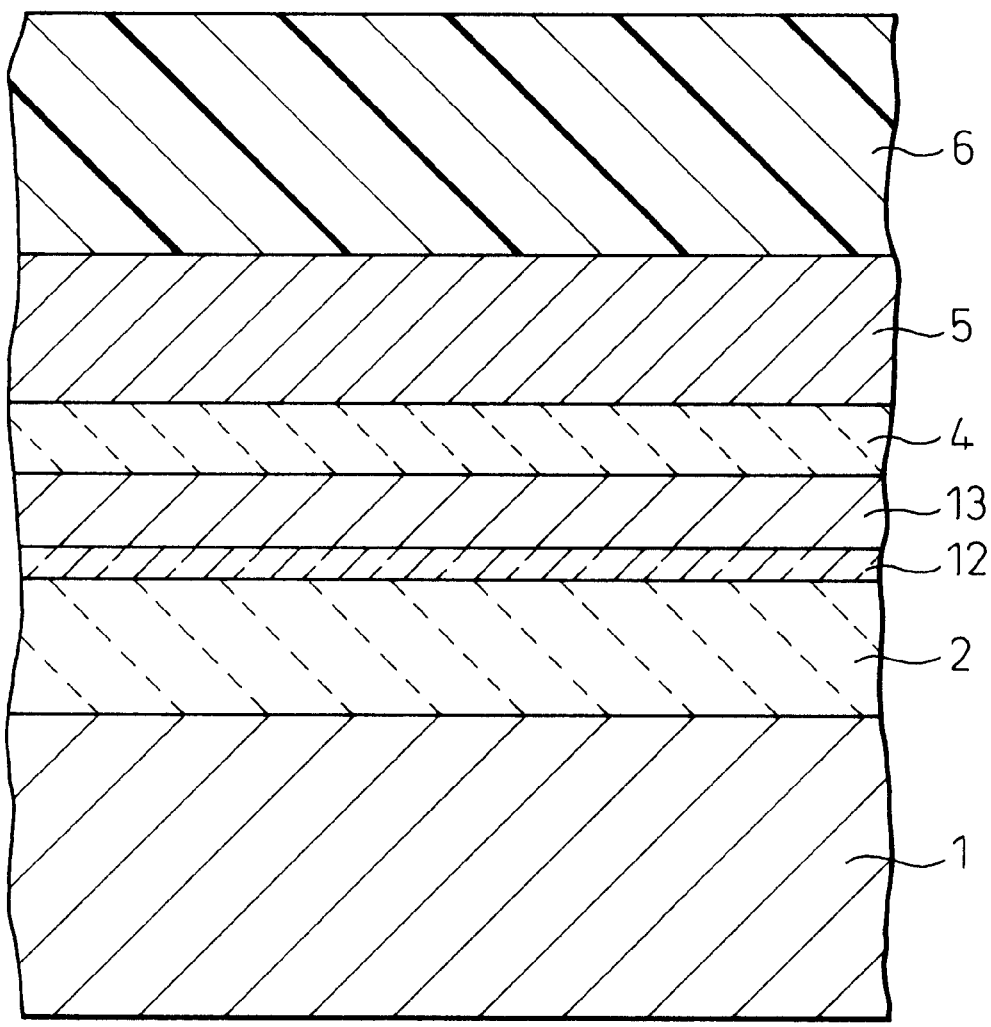
FIG. 2 is a cross-sectional view of another phase change optical recording medium.

FIG. 2 shows a cross-sectional view of an example of the second embodiment of the present invention, in which the reference numeral 1 denotes a substrate, 2 a first transparent dielectric layer, 12 a third transparent dielectric layer, 13 a recording layer, 4 a second transparent dielectric layer, 5 a reflective layer and 6 a resin protecting layer. The layers similar to the layers in FIG. 1 are denoted by the same reference numerals.

(3) The same effect as obtained in the above second embodiment of the present invention can be obtained by increasing the molar ratio of oxygen in the first transparent dielectric layer which is in contact with the recording layer (or the molar ratio of oxygen in the oxide of the layer), in place of the insertion of an oxygen-rich transparent dielectric layer between the first transparent dielectric layer and the recording layer.

Such a first transparent dielectric layer can be obtained by sputtering in an atmosphere including an oxygen-containing gas, as described for the third transparent dielectric layer. The thickness of the first transparent dielectric layer is, however, not changed from the original thickness for the first transparent dielectric layer, typically in a range of 50 to 250 nm.

Since it is generally preferred that the transparent dielectric layers as the protecting layers of an optical recording medium do not contain excess oxygen, it is preferred in the third embodiment of the present invention that only the first transparent dielectric layer in contact with the recording layer is formed by sputtering in a mixed gas of an oxygen-containing gas and an inert gas, but the other transparent dielectric layer(s) be formed in an inert gas atmosphere without an oxygen-containing gas.

In the third embodiment of the present invention, the other elements of the recording medium may be basically the same as described for the first or second embodiment of the present invention except that the first transparent dielectric layer in contact with the recording layer has a larger oxygen molar ratio than that of the second transparent dielectric layer and the recording layer may not be an oxygen-containing layer.

Figure 3:
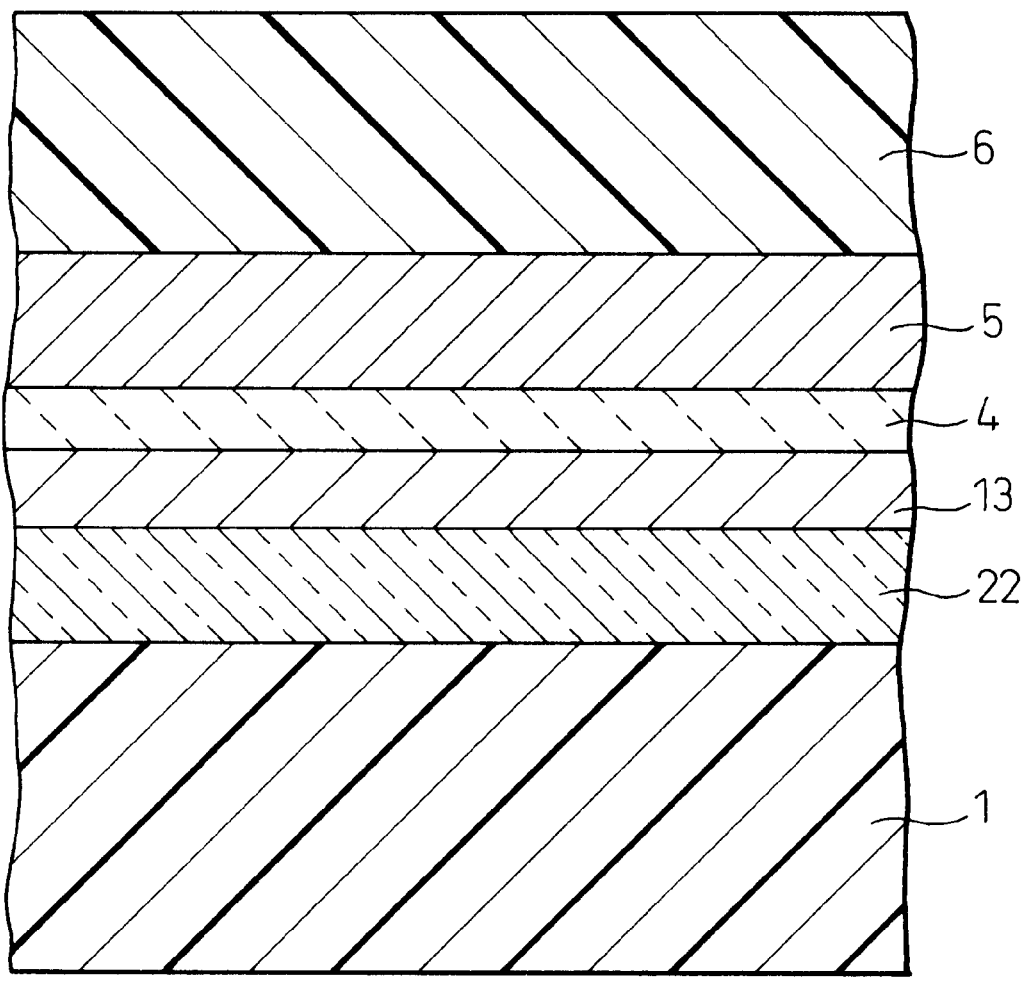
FIG. 3 is a cross-sectional view of a further phase change optical recording medium.

FIG. 3 shows a cross-sectional view of an example of the third embodiment of the present invention, in which the reference numeral 1 denotes a substrate, 22 a first transparent dielectric layer, 13 a recording layer, 4 a second transparent dielectric layer, 5 a reflective layer and 6 a resin protecting layer.

In the second and third embodiments of the present invention, the excess oxygen-containing dielectric layer should be the first or third dielectric layer which underlies the recording layer and is in contact with the recording layer. This is because the state (peeling, etc.) of the interface between the recording layer and the underlying dielectric layer has a large influence on the deterioration of the repetition durability. If an excess oxygen-containing dielectric layer is disposed between the recording layer and the reflective layer, a desired effect is hardly obtained and the durability may be reduced. It is considered that an excess oxygen present in the second dielectric layer oxidizes the recording layer and the balance of the optical characteristics is reduced.

In another aspect of the present invention, there is also provided a process for manufacturing a phase change optical recording medium as described above, said process is characterized in one of the following:

1) the recording layer is deposited by sputtering conducted in an atmosphere in which at least one oxygen atom-containing gas is included;

2) the first and second transparent dielectric layers are formed by sputtering in a rare gas atmosphere, and the third transparent dielectric layer between the first transparent dielectric layer and the recording layer is formed by sputtering in an atmosphere comprising a gaseous mixture of at least one oxygen atom-containing gas and a rare gas; and 3) the first transparent dielectric layer is formed by sputtering in an atmosphere comprising a gaseous mixture of at least one oxygen atom-containing gas and a rare gas, and the second transparent dielectric layer is formed by sputtering in a rare gas atmosphere.

EXAMPLES

Examples 1–3 and Comparative Examples 1–3

Phase change optical recording media having the structure of a transparent substrate/a first transparent dielectric layer/a recording layer/a transparent dielectric adhesive layer/a second transparent dielectric layer/a reflective layer/a UV-curable protecting layer were manufactured.

The sputtering device used was Inline Sputter ILC3102type (ANELVA Corp.) using a target of 8 inches. The sputtering was carried out while the substrate was being rotated.

The transparent substrate was a substrate which was to be used for a 650 Mbyte capacity phase change optical recording medium (a 120 mm-diameter phase change optical recording medium used in an optical drive LF-1000 type manufactured by Matsushita Electric Industry Corp., Ltd.). This substrate was made of a polycarbonate and has tracking grooves having a track pitch of 1.2 $\mu$m and a track width for write of about 0.6 $\mu$m.

The first transparent dielectric layer was a layer of ZnS—SiO$_2$, 140 nm thick, formed by sputtering in an Ar gas and using a target of ZnS:SiO$_2$=80:20 by mole.

The recording layer was a 25 nm-thick layer of Ge$_2$Sb$_2$Te$_5$ which contains oxygen.

The transparent dielectric adhesive layer was a layer of ZnS, 25 nm thick, formed by sputtering in Ar gas and using a target of ZnS.

The second transparent dielectric layer was a layer of ZnS—SiO$_2$, 20 nm thick, formed by sputtering in an Ar gas and using a target of ZnS:SiO$_2$=80:20 by mole.

The reflective layer was a layer of AlCr alloy (Al:Cr=97:3 by atom) 100 nm thick, formed by sputtering in an Ar gas.

The UV-curable protecting layer had a thickness of 2 $\mu$m.

In Examples 1–3 and Comparative Examples 1–2, the recording layer was formed by sputtering in a mixed gas of Ar and O$_2$, while the content of oxygen (O$_2$) was varied in a range of 0.5 to 35 atomic %. In Comparative Example 3, the recording layer was formed by sputtering in an Ar gas alone.

The content of oxygen in the recording layer was measured by forming the same recording layer, about 1.3 $\mu$m thick, on a silicon substrate under the same conditions as in each Example or Comparative Example and determining the oxygen content by secondary ion mass spectrometry (SIMS). The measured oxygen contents are shown in the Table 1.

The optical medium samples thus manufactured were evaluated in the following manner. A phase change optical medium sample was loaded on an optical disc drive device (LF-1000 type drive, manufactured by Matsushita Electric Industry Co., Ltd.). The medium was rotated at 2026 rpm. Overwrite of a signal 1.5T was repeated using a peak power of 11 mW and a bias power of 5.5 mW by a semiconductor laser having a wavelength of 780 nm. Reading was done at a read power of 1.0 mW. Thus, the number of repeatable overwrite (verified number) was determined. The measured location of the medium was on an about 27 mm diameter circle and the test was repeated on one track near Track No. 26000 in the innermost data zone.

Further, the bit error rate of the sample after 200,000 overwrites was evaluated. The evaluation of the bit error rate was carried out by reading the 1.5T signal in an innermost data zone after 200,000 overwrites with 1.5T signals and 4T signals. The 1.5T and 4T signals are defined as the shortest and longest signals with a single frequency between written marks in the (2,7) modulation recording method, respectively. The abbreviation "T" stands for the data bit period.

The results are shown in Table 1.

TABLE 1

| Sample | Oxygen content (atomic %) | Overwrite number without defect (× 10,000) | Bit error rate after 200,000 overwrites |
| --- | --- | --- | --- |
| Com. Ex. 1 | 0 | 9 | 8/10$^5$ |
| Com. Ex. 2 | 0.5 | 10 | 8/10$^5$ |
| Ex. 1 | 1 | 16 | 7/10$^6$ |
| Ex. 2 | 15 | 30 | 4/10$^6$ |
| Ex. 3 | 30 | 20 | 8/10$^6$ |
| Com. Ex. 3 | 35 | 10 | 8/10$^5$ |

In Examples 1–3, a deformed wave shape of the reproduced signal caused by peeling of the layer or formation of cracks was not observed. The repeatable overwrite numbers were 160,000 times to 300,000 times and the bit error rates were low, 8×10$^6$ to 4/10$^6$.

It can be seen from the above that the effect of improving the overwritable number is obtained when the oxygen content was in a range of 1 to 30 atomic %. If the oxygen content was less than 1 atomic %, the effect of improving the overwritable number was not seen, and if the oxygen content was more than 30 atomic %, the overwritable number decreased.

Examples 4–6 and Comparative Examples 3–5

In these Examples and Comparative Examples, the procedures as in Examples 1–3 were repeated to manufacture and evaluate phase change optical recording media except that the recording layer was formed by sputtering in a mixed gas of Ar and $O_2$ with an oxygen partial pressure being in a range of 6.7 mPa to 2.7 Pa.

The results are shown in Table 2.

TABLE 2

| Sample | Oxygen gas partial pressure (Pa) | Overwrite number without defect (× 10,000) | Bit error rate after 200,000 overwrites |
|---|---|---|---|
| Com. Ex. 4 | 0.0067 | 10 | $9/10^5$ |
| Ex. 4 | 0.027 | 15 | $9/10^6$ |
| Ex. 5 | 0.13 | 30 | $5/10^6$ |
| Ex. 6 | 1.1 | 20 | $7 \times 10^6$ |
| Com. Ex. 5 | 2.7 | 10 | $6/10^5$ |

It can be seen from the above that the oxygen partial pressure in a range of 15 mPa to 1.5 Pa is adequate to improve the overwritable number. If the oxygen partial pressure is less than 15 mPa, the effect of improving the overwritable number is not seen, and if the oxygen partial pressure is more than 1.5 Pa, the overwritable number decreases.

Examples 7–9

The procedures as in Examples 1–3 were repeated to manufacture and evaluate phase change optical recording media except that the recording layer was formed by sputtering in a mixed gas of Ar and an oxygen-containing gas, i.e., Ar/$H_2O$ with a $H_2O$ partial pressure of 0.67 Pa (Example 7), Ar/$CO_2$ with a $CO_2$ partial pressure of 0.13 Pa (Example 8) or Ar/CO with CO partial pressure of 0.67 Pa (Example 9).

The results are shown in Table 3.

TABLE 3

| Sample | Recording layer sputter gas | Overwrite number without defect (× 10,000) | Bit error rate after 200,000 overwrites |
|---|---|---|---|
| Ex. 7 | Ar/$H_2O$ | 20 | $8/10^6$ |
| Ex. 8 | Ar/$CO_2$ | 25 | $6/10^6$ |
| Ex. 9 | Ar/CO | 18 | $9/10^6$ |

Examples 10–14 and Comparative Examples 6–8

Phase change optical recording media having a structure of a transparent substrate/a first transparent dielectric layer/a third transparent dielectric layer/a recording layer/a second transparent dielectric layer/a reflective layer/a UV-curable protecting layer were manufactured.

The sputtering device used was Inline Sputter ILC3102type (ANELVA Corp.) using a target of 8 inches. The sputtering was carried out while the substrate was being rotated.

The transparent substrate was a substrate which was to be used for a 650 Mbyte capacity phase change optical recording medium (a 120 mm-diameter phase change optical recording medium used in an optical drive LF-1000 type manufactured by Matsushita Electric Industry Corp., Ltd.). This substrate was made of a polycarbonate and has tracking grooves having a track pitch of 1.2 $\mu$m and a track width for write of about 0.6 $\mu$m.

The first transparent dielectric layer was a layer of ZnS—$SiO_2$, 140 nm thick, formed by sputtering in an Ar gas and using a target of ZnS:$SiO_2$=80:20 by mole.

The third transparent dielectric layer was a layer of ZnS—$SiO_2$, formed by sputtering in a mixed gas of Ar and $O_2$ and using a target of ZnS:$SiO_2$=80:20 by mole. The thickness of the third transparent dielectric layer was varied in a range of 0–15 nm in Examples 10–14 and Comparative Examples 6–8.

The recording layer was a 25 nm-thick layer of $Ge_2Sb_2Te_5$ sputtered in an Ar gas.

The second transparent dielectric layer was a layer of ZnS—$SiO_2$, 40 nm thick, formed by sputtering in an Ar gas and using a target of ZnS:$SiO_2$=80:20 by mole.

The reflective layer was a layer of AlCr alloy (Al:Cr=97:3 by atom) 100 nm thick, formed by sputtering in an Ar gas.

The UV-curable protecting layer had a thickness of 2 $\mu$m.

In Examples 10–14 and Comparative Examples 5–11, the molar ratio of oxygen of the first to fourth transparent dielectric layers of ZnS—$SiO_2$ was determined by forming the same transparent dielectric layer as each of the layers except that the thickness was about 110 nm on a silicon substrate and measuring the refractive index of the layer. An increase in oxygen content of the layer can be confirmed by decrease in the refractive index of the layer.

In Examples 10–14, the refractive index of the third transparent layer of ZnS—$SiO_2$ was about 2.00. In Comparative Examples 6–8, the refractive index of the first transparent layer of ZnS—$SiO_2$ was about 2.14. From this measurement, it was confirmed that the oxygen content of the ZnS—$SiO_2$ layer was increased when the layer was formed by sputtering in a mixed gas of Ar and $O_2$, in comparison with when formed in an Ar gas alone. Incidentally, the refractive index of the oxygen-treated ZnS—$SiO_2$ was 2.00 and that of the non-oxygen-treated ZnS—$SiO_2$ was 2.14, in all the following Examples and Comparative Examples.

The results are shown in Table 4.

TABLE 4

| Sample | Thickness of 3rd dielectric layer (nm) | Overwrite number without defect (× 10,000) | Bit error rate after 200,000 overwrites |
|---|---|---|---|
| Com. Ex. 6 | 0 | 9 | $8/10^5$ |
| Com. Ex. 7 | 0.5 | 10 | $8/10^5$ |
| Ex. 10 | 1 | 15 | $8/10^6$ |
| Ex. 11 | 3 | 18 | $7/10^6$ |
| Ex. 12 | 5 | 24 | $5/10^6$ |
| Ex. 13 | 7 | 20 | $6/10^6$ |
| Ex. 14 | 10 | 15 | $9/10^6$ |
| Com. Ex. 8 | 15 | 10 | $8/10^5$ |

In Examples 10–14, the repeatable overwrite number was high, above 150,000, and the bit error rate was small, less than $9/10^6$. In Comparative Examples 5–7, the repeatable overwrite number was not more than 100,000, which is a level acceptable to a practical use but with a low reliability, and the bit error rate was high, not less than $8/10^5$.

From the above results, it was seen that excellent characteristics, with a less-disordered wave shape of the reproduced signal, could be obtained when the third transparent dielectric layer had a thickness in a range of 1 to 10 nm. If the thickness of the third transparent dielectric layer was less than 1 nm, the non-smooth surface of the first transparent dielectric layer caused by insufficient oxygen was not compensated for and the effect of improving the overwrite repetition characteristics is small. If the thickness of the third transparent dielectric layer was more than 10 nm, too much oxygen affected the recording layer by oxidizing etc., during repeated overwrite and the repeatable number of overwrites was lowered. Further, if the thickness of the third transparent dielectric layer was more than 10 nm, the layer stress becomes larger, causing peeling and cracking, and an adequate sensitivity and reflection of the medium were not obtained.

Examples 15–17

The procedures as in Examples 10–14 were repeated to manufacture and evaluate phase change optical recording media, except that the third transparent dielectric layer was formed by sputtering in a mixed gas of Ar and $H_2O$ (Example 15), in a mixed gas of Ar and $CO_2$ (Example 16), or in a mixed gas of Ar and CO (Example 17) and had a thickness of 5 nm in Examples 15–17.

The results are shown in Table 5.

TABLE 5

| Sample | Sputter gas for 3rd dielectric layer | Overwrite number without defect (× 10,000) | Bit error rate after 200,000 overwrites |
|---|---|---|---|
| Ex. 15 | Ar/$H_2O$ | 15 | $6/10^6$ |
| Ex. 16 | Ar/$CO_2$ | 15 | $7/10^6$ |
| Ex. 17 | Ar/CO | 14 | $8/10^6$ |

In these Examples, a deformed wave shape of the reproduced signal, caused by peeling or cracking was not seen. The repeatable overwrite numbers were 140,000 or more and the bit error rates were $6/10^6$ or less.

Comparative Examples 9–10

The procedures as in Examples 10–14 were repeated to manufacture and evaluate phase change optical recording media, except that the second and third transparent dielectric layers were formed by sputtering in an Ar gas alone and the first transparent dielectric layer was formed by sputtering in a mixed gas of Ar and $O_2$ (Comparative Example 8), and the second and third transparent dielectric layers were formed by sputtering in a mixed gas of Ar and $O_2$ and the first transparent dielectric layer was formed by sputtering in an Ar gas alone (Comparative Example 9), as shown in Table 6.

TABLE 6

| Dielectric layer | 1st | 3rd | 2nd | 4th |
|---|---|---|---|---|
| Com. Ex. 9 | Ar/$O_2$ | Ar | Ar | non |
| Com. Ex. 10 | Ar | Ar/$O_2$ | Ar/$O_2$ | non |

TABLE 6-continued

| Dielectric layer | 1st | 3rd | 2nd | 4th |
|---|---|---|---|---|
| Com. Ex. 11 | Ar | non | Ar/$O_2$ | Ar |
| Com. Ex. 12 | Ar/$O_2$ | Ar | Ar | Ar/$O_2$ |
| Com. Ex. 13 | Ar | Ar/$O_2$ | Ar/$O_2$ | Ar |

The results are shown in Table 7.

TABLE 7

| Sample | Overwrite number without defect (× 10,000) | Bit error rate after 200,000 overwrites |
|---|---|---|
| Com. Ex. 9 | 7 | $6/10^5$ |
| Com. Ex. 10 | 6 | $8/10^5$ |
| Com. Ex. 11 | 7 | $8/10^5$ |
| Com. Ex. 12 | 10 | $6/10^5$ |
| Com. Ex. 13 | 8 | $7/10^5$ |

In Comparative example 9, a significantly deformed wave shape of the reproduced signal caused by peeling or cracking was observed. The repeatable overwrite number was low, 70,000 times, and the bit error rate was high, $6/10^5$. It is supposed that the flow of the recording layer was suppressed by an increased layer strength of the first transparent dielectric layer, but the deformation of the wave shape of the reproduced signal increased due to separation between the third transparent dielectric layer and the recording layer.

In Comparative example 10, a significantly deformed wave shape of the reproduced signal caused by peeling or cracking was observed. The repeatable overwrite number was low, 60,000 times, and the bit error rate was high, $8/10^5$. It is supposed that the flow of the recording layer was suppressed by an increased adhesion between the third transparent dielectric layer and the recording layer, but the deformation of the wave shape of the reproduced signal increased since the recording layer was oxidized and the adhesion between the second transparent dielectric layer and the reflective layer decreased due to sputtering of the second transparent dielectric layer in a mixed gas of Ar and $O_2$.

Comparative example 11

A phase change optical recording medium having the structure of a transparent substrate/a first transparent dielectric layer/a recording layer/a second transparent dielectric layer/a fourth transparent dielectric layer/a reflective layer/a UV-curable protecting layer was manufactured, in the procedures similar to those as in Examples 10–14, but the first and fourth transparent dielectric layers were formed by sputtering in an Ar gas and the second transparent dielectric layer was formed by sputtering in a mixed gas of Ar and $O_2$.

The results are shown in Table 7.

In Comparative example 11, a significantly deformed wave shape of the reproduced signal caused by peeling or cracking was observed. The repeatable overwrite number was low, 70,000 times, and the bit error rate was high, $8/10^5$. It is supposed that the deformation of the wave shape of the reproduced signal increased since the recording layer was oxidized due to the second transparent dielectric layer formed by sputtering in a mixed gas of Ar and $O_2$ and the adhesion of the first transparent dielectric layer with the recording layer was low.

Comparative Example 12

A phase change optical recording medium having the structure of a transparent substrate/a first transparent dielectric layer/a third transparent dielectric layer/a recording layer/a second transparent dielectric layer/a fourth transparent dielectric layer/a reflective layer/a UV-curable protecting layer were manufactured, in the same procedures as in Examples 10–14.

However, the first and fourth transparent dielectric layers were formed by sputtering in a mixed gas of Ar and $O_2$ and the second and third transparent dielectric layers were formed by sputtering in an Ar gas alone.

The obtained phase change optical recording medium was evaluated for the repetition characteristics of overwriting in the same manner as for Examples 10–14.

In Comparative Example 12, a deformed wave shape of the reproduced signal caused by peeling or cracking was not observed but the repeatable overwrite number was 100,000 times which is acceptable in practical use but low in reliability and the bit error rate was high, $6/10^5$.

It is supposed that the adhesion between the recording layer and the third transparent dielectric layer formed by sputtering in an Ar gas alone was low so that sufficient repetition durability was not exhibited. It is also supposed that the oxygen-containing fourth transparent dielectric layer had an increase layer strength but had a reduced adhesion with the reflective layer so that the repetition durability was lowered.

Comparative example 13

A phase change optical recording medium having the structure of a transparent substrate/a first transparent dielectric layer/a third transparent dielectric layer/a recording layer/a second transparent dielectric layer/a fourth transparent dielectric layer/a reflective layer/a UV-curable protecting layer was manufactured, in the procedures similar to those as in Examples 10–14, but the first and fourth transparent dielectric layers were formed by sputtering in an Ar gas and the second and third transparent dielectric layers were formed by sputtering in a mixed gas of Ar and $O_2$.

The results are shown in Table 7.

In Comparative example 11, a significantly deformed wave shape of the reproduced signal caused by peeling or cracking was observed. The repeatable overwrite number was low, 80,000 times, and the bit error rate was high, $7/10^5$. It is supposed that the flow of the recording layer was suppressed by an increased adhesion between the third transparent dielectric layer and the recording layer, but the deformation of the wave shape of the reproduced signal increased since the recording layer was oxidized and the separation between the second transparent dielectric layer and the recording layer occurred due to the second transparent dielectric layer formed by sputtering in a mixed gas of Ar and $O_2$.

It can be seen from the above Examples 10–17 that in a phase change optical recording medium comprising a substrate, a first transparent dielectric layer, a third transparent dielectric layer, a recording layer, a second transparent dielectric layer and a reflective layer, an excellent repeated overwrite and erase durability can be obtained in accordance with the present invention by inserting a third transparent dielectric layer containing oxygen in a higher molar ratio than the first and second transparent dielectric layers and making the thickness of the third transparent dielectric layer in a range of 1 to 10 nm. While an Ar gas was used in the above Examples, other rare gases may be used to obtain similar effects.

Example 18

A phase change optical recording medium having the structure of a transparent substrate/a first transparent dielectric layer/a recording layer/a second transparent dielectric layer/a reflective layer/a UV-curable protecting layer were manufactured, in the same procedures as in Examples 10–14.

However, the first transparent dielectric layer was a layer of $ZnS-SiO_2$, 140 nm thick, formed by sputtering in a mixed gas of Ar and $O_2$ and using a target of $ZnS:SiO_2 = 80:20$ by mole.

The obtained phase change optical recording medium was evaluated for the repetition characteristics of overwrite in the same manner as for Examples 10–14.

The atmospheres used for forming the transparent dielectric layers are summarized in Table 8.

It was confirmed that the first transparent dielectric layer was a layer of $ZnS-SiO_2$ formed by sputtering in a mixed gas of Ar and $O_2$ contained oxygen in a molar ratio higher than that of the transparent dielectric layer of $ZnS-SiO_2$ formed by sputtering in an Ar gas alone, in the same method (refractive index method) used in Examples 10–14.

The results are shown in Table 9.

TABLE 8

| Dielectric layer | 1st | 3rd | 2nd | 4th |
| --- | --- | --- | --- | --- |
| Ex. 18 | $Ar/O_2$ | non | Ar | non |
| Com. Ex. 14 | Ar | non | Ar | non |
| Com. Ex. 15 | Ar | non | $Ar/O_2$ | non |
| Com. Ex. 16 | $Ar/O_2$ | non | $Ar/O_2$ | non |
| Ex. 19 | $Ar/H_2O$ | non | Ar | non |
| Ex. 20 | $Ar/CO_2$ | non | Ar | non |
| Ex. 21 | $Ar/CO$ | non | Ar | non |

The results are shown in Table 9.

TABLE 9

| Sample | Overwrite number without defect (× 10,000) | Bit error rate after 200,000 overwrites |
| --- | --- | --- |
| Ex. 18 | 20 | $7/10^6$ |
| Com. Ex. 14 | 9 | $8/10^5$ |
| Com. Ex. 15 | 6 | $8/10^5$ |
| Com. Ex. 16 | 7 | $7/10^5$ |
| Ex. 19 | 15 | $6/10^6$ |
| Ex. 20 | 15 | $7/10^6$ |
| Ex. 21 | 14 | $8/10^6$ |

In Example 18, a deformed wave shape of the reproduced signal caused by peeling or cracking was not observed. The repeatable overwrite number was high, 200,000 times, and the bit error rate was low, $7/10^6$.

Comparative Example 14

The same procedures as in Example 18 were repeated to manufacture and evaluate a phase change optical recording medium, but the first and second transparent dielectric layers were formed by sputtering in an Ar gas alone.

In Comparative Example 14, a deformed wave shape of the reproduced signal caused by peeling of the layer or formation of cracks was not observed, but the repeatable overwrite number was 90,000 times which is acceptable in practical use but is low in reliability. Further, the bit error rate was high, $8/10^5$.

Comparative Example 15

The same procedures as in Example 18 were repeated to manufacture and evaluate a phase change optical recording medium, but the first transparent dielectric layer was formed by sputtering in an Ar gas alone and the second transparent dielectric layer was formed by sputtering in a mixed gas of Ar and $O_2$.

In Comparative Example 15, a significantly deformed wave shape of the reproduced signal caused by peeling or cracking was observed and the repeatable overwrite number was 60,000 times and the bit error rate was high, $8/10^5$.

It is supposed that the flow of the recording layer was suppressed by an increased adhesion between the second transparent dielectric layer and the recording layer, but the deformation of the wave shape of the reproduced signal increased since the recording layer was oxidized and the adhesion between the second transparent dielectric layer and the reflective layer decreased due to the second transparent dielectric layer formed by sputtering in a mixed gas of Ar and $O_2$.

Comparative Example 16

The same procedures as in Example 18 were repeated to manufacture and evaluate a phase change optical recording medium, but the first and second transparent dielectric layers were formed by sputtering in a mixed gas of Ar and $O_2$.

In Comparative Example 16, a significantly deformed wave shape of the reproduced signal caused by peeling or cracking was observed and the repeatable overwrite number was 70,000 times and the bit error rate was high, $7/10^5$.

It is supposed that the flow of the recording layer was suppressed by an increased adhesion between the first and second transparent dielectric layers and the recording layer, but the deformation of the wave shape of the reproduced signal increased since the recording layer was oxidized and the adhesion between the second transparent dielectric layer and the reflective layer decreased due to the second transparent dielectric layer formed by sputtering in a mixed gas of Ar and $O_2$.

Examples 19–21

The same procedures as in Example 18 were repeated to manufacture and evaluate phase change optical recording media, but the first transparent dielectric layer was formed by sputtering in a mixed gas of Ar and $H_2O$ (Example 19), in a mixed gas of Ar and $CO_2$ (Example 20), or in a mixed gas of Ar and CO (Example 21).

In Examples 19–21, a deformed wave shape of the reproduced signal caused by peeling or cracking was not observed.

In Example 19, the repeatable overwrite number was 150,000 times and the bit error rate was low, $6\times10^5$.

In Example 20, the repeatable overwrite number was 150,000 times and the bit error rate was low, $7\times10^6$.

In Example 21, the repeatable overwrite number was 140,000 times and the bit error rate was low, $8\times10^6$.

It is demonstrated from the above Examples 18–21 that in a phase change optical recording medium comprising a substrate, a first transparent dielectric layer, a recording layer, a second transparent dielectric layer and a reflective layer, an excellent repeated overwrite and erase durability can be obtained in accordance with the present invention by making the first transparent dielectric layer in contact with the recording layer contain oxygen in a higher molar amount than the second transparent dielectric layer. While an Ar gas was used in the above Examples, other rare gases may be used to obtain similar effects.

What is claimed is:

1. A phase change optical recording medium in which writing, reading and/or erasing of information is conducted by utilizing a change of phase of a recording layer by irradiation with light, said recording medium comprising a substrate, a first transparent dielectric layer on the substrate, a recording layer on the first transparent dielectric layer, a second transparent dielectric layer on the recording layer, and a reflective layer on the second transparent dielectric layer, wherein the first and second dielectric layers in contact with the recording layer contain at least an oxide or nitride;

wherein said recording layer in the recording medium is made of a chalcogen alloy comprising Ge, Sb and Te containing oxygen in an amount of 3 to 30 atomic % based on the recording layer.

2. The phase change optical recording medium according to claim 1, wherein an adhesive layer of a metal sulfide is further inserted between said recording layer and one of said first and second transparent dielectric layers which are in contact with said recording layer.

3. The phase change optical recording medium according to claim 1, wherein said recording layer is made of a material containing oxygen in an amount of 3 to 15 atomic %.

4. The phase change optical recording medium according to claim 1, wherein said recording layer has a thickness of 5–40 nm.

* * * * *